United States Patent [19]
Satoh et al.

[11] Patent Number: 5,847,795
[45] Date of Patent: Dec. 8, 1998

[54] LIQUID CRYSTAL DISPLAY APPARATUS AND ANTI-REFLECTION FILM APPLICABLE THERETO

[75] Inventors: Takashi Satoh; Katsumi Kurematsu, both of Hiratsuka; Hiroshi Takabayashi, Atsugi; Masanori Takahashi, Chigasaki; Akisato Katanosaka, Toyonaka; Noriko Matoba, Osaka, all of Japan

[73] Assignee: Canon Kabushiki Kaisha, Tokyo, Japan

[21] Appl. No.: 687,186

[22] Filed: Jul. 25, 1996

[30] Foreign Application Priority Data

Jul. 27, 1995 [JP] Japan .................................... 7-192303
Aug. 3, 1995 [JP] Japan .................................... 7-198820

[51] Int. Cl.⁶ ........................... G02F 1/1335; G02B 1/11
[52] U.S. Cl. ......................... 349/137; 359/601; 313/479
[58] Field of Search .................................. 349/105, 122, 349/104; 359/601, 609; 348/834; 313/478, 479; 428/323, 325, 331, 332, 307.3

[56] References Cited

U.S. PATENT DOCUMENTS

| | | | |
|---|---|---|---|
| 4,816,333 | 3/1989 | Lange et al. | 428/331 |
| 5,153,481 | 10/1992 | Matsuda et al. | 313/479 |
| 5,189,337 | 2/1993 | Endo et al. | 313/479 |
| 5,227,900 | 7/1993 | Inaba et al. | 359/56 |
| 5,372,745 | 12/1994 | Yoshinaga et al. | 252/299.01 |
| 5,446,339 | 8/1995 | Kinoshita et al. | 313/478 |
| 5,473,453 | 12/1995 | Kurematsu | 359/67 |
| 5,495,351 | 2/1996 | Shingaki et al. | 359/53 |
| 5,612,128 | 3/1997 | Endo et al. | 428/331 |
| 5,667,725 | 9/1997 | Watanabe et al. | 252/309 |

FOREIGN PATENT DOCUMENTS

| | | |
|---|---|---|
| 0596733 | 5/1994 | European Pat. Off. . |
| 50-096128 | 7/1975 | Japan . |
| 55-112107 | 8/1980 | Japan . |
| 57-204002 | 12/1982 | Japan . |
| 59-116601 | 7/1984 | Japan . |
| 07048527 | 2/1995 | Japan . |

OTHER PUBLICATIONS

Tohda et al., SID, Japan Display (1992) 289–292. No Date Provided.

*Primary Examiner*—Hung X. Dang
*Assistant Examiner*—Tai V. Duong
*Attorney, Agent, or Firm*—Fitzpatrick, Cella, Harper & Scinto

[57] ABSTRACT

A liquid crystal display apparatus includes a liquid crystal panel for data display comprising a pair of oppositely disposed substrates and a liquid crystal disposed between the substrates, a sheet of substantially transparent protection plate disposed opposite to and with a prescribed gap from a display surface of the liquid crystal panel for protecting the liquid crystal panel, and a polarizer sheet for selectively transmitting light having a plane of polarization in a prescribed direction disposed on at least the display surface of the liquid crystal panel. The display apparatus further includes an anti-reflection film disposed on at least a front surface on an opposite side with respect to the liquid crystal panel of the protection plate among two surfaces of the protection plate and a surface of the polarizer sheet. The anti-reflection film comprises a layer structure including at least one layer for promoting optical interference to decrease reflected light brightness and provided with surface unevennesses at a prescribed pitch.

8 Claims, 5 Drawing Sheets

LIQUID CRYSTAL DISPLAY APPARATUS AND ANTI-REFLECTION FILM APPLICABLE THERETO

FIELD OF THE INVENTION AND RELATED ART

The present invention relates to a liquid crystal display apparatus having an improved observability or viewing characteristic, a data transmission apparatus including such a liquid crystal display apparatus and an anti-reflection film suitable therefor.

Hitherto, various liquid crystal display apparatus including a liquid crystal cell or panel for data display have been proposed. FIG. 1 is a schematic sectional view of an example of such liquid crystal display apparatus.

Referring to FIG. 1, a liquid crystal display apparatus 1 includes a transmission-type liquid crystal panel 2, a backlight device 3 for illuminating the liquid crystal panel 2 from a back side thereof, and a transparent protection plate 4 for protecting the liquid crystal panel 1 from an external impact, etc. The liquid crystal panel 2, the backlight device 3 and the protection plate 4 are affixed to a case or housing 5.

The liquid crystal panel 2 is provided with a pair of polarizers 10a and 10b applied onto both surfaces thereof for transmitting only a light fraction having a prescribed plane of polarization, so as to leave prescribed gaps between the polarizer 10a and the protection plate 4 and between the polarizer 10b and the backlight device 3.

In a conventional liquid crystal display apparatus having a structure as described above, display data on the liquid crystal panel 2 is observed through the protection plate 4 owing to illumination from the back side by the backlight device 3.

The above-mentioned liquid crystal display apparatus 1 may be provided with an anti-glare treatment such that a front surface of the polarizer 10a and both surfaces of the protection plate 4 are formed in uneven surfaces so as to scatter reflection light incident thereto from surrounding illumination appliances.

Owing to the anti-glare treatment for scattering the reflection of incident light from environment, the glare may be apparently reduced, but the entire reflected light quantity is not decreased to make whitish the whole display on the liquid crystal panel 2, so that the observability or recognizability of the displayed data or content is liable to be lowered.

Further, as a prescribed gap is formed between the liquid crystal panel 2 (or the polarizer 10a thereon) and the protection plate 4, the display data is blurred if the degree of diffusion by the anti-glare treatment due to surface unevennesses on the protection plate 4 is increased, thus obstructing clear recognition thereof. Accordingly, the anti-glaring diffusivity of the protection plate 4 has to be suppressed, so that the anti-glare effect is limited and a sufficient observability of display data on the liquid crystal panel 2 may not be obtained.

In place of such an anti-glare treatment applied to the polarizer 10a and the protection plate 4, it may be conceived of forming anti-reflection layer for reducing reflection brightness by utilizing optical interference on the front surface of the polarizer 10a and both surfaces of the protection plate 4. In this case, the brightness of reflected light incident from surrounding illumination devices is decreased, but the contour of reflected images is clearly visible, so that the anti-glare effect is not sufficient and the display data on the liquid crystal panel cannot be recognized.

The above-mentioned anti-glare-type anti-surface reflection film, particularly one provided with surface microunevennesses, and application thereof to display apparatus, have been disclosed in Japanese Laid-Open Patent Application (JP-A) 50-96128, JP-A 55-112107, JP-A 59-116601, etc.

An ordinary anti-glare-type anti-reflection film has been formed by applying a paint formed by dispersing silica particles within a binder vehicle. It has been also practiced to form a roughened antiglare surface on a substrate by blasting with abrasive particles or etching.

As described above, however, such an antiglare-type anti-reflection film or antiglare surface may be effective for reducing reflected images of external light sources, such as interior illumination (fluorescent lamps, etc.) to provide an improved observability, but the entire reflected light quantity is not substantially different from that of a non-antiglare surface, so that the contrast on the display surface of the display apparatus can be lowered by such reflected external light to result in an insufficient antiglare effect.

SUMMARY OF THE INVENTION

An object of the present invention is to provide a liquid crystal display apparatus with an improved observability or recognizability of display on a liquid crystal panel therein.

Another object of the present invention is to provide an anti-reflection film capable of exhibiting an improved antiglare effect and suitably used particularly for a display apparatus.

According to the present invention, there is provided a liquid crystal display apparatus, comprising: a liquid crystal panel for data display comprising a pair of oppositely disposed substrates and a liquid crystal disposed between the substrates, a sheet of substantially transparent protection plate disposed opposite to and with a prescribed gap from a display surface of the liquid crystal panel for protecting the liquid crystal panel, and a polarizer sheet for selectively transmitting light having a plane of polarization in a prescribed direction disposed on at least the display surface of the liquid crystal panel, wherein the display apparatus further includes an anti-reflection film disposed on at least a front surface on an opposite side with respect to the liquid crystal panel of the protection plate among two surfaces of the protection plate and a surface of the polarizer sheet, said anti-reflection film comprising a layer structure including at least one layer for promoting optical interference to decrease reflected light brightness and provided with surface unevennesses at a prescribed pitch.

In a preferred embodiment, the surface unevennesses are provided to the anti-reflection film at a pitch of at least 20 $\mu$m and at most a half of the pixel pitch of the liquid crystal panel.

According to another aspect of the present invention, there is provided an anti-reflection film, comprising transparent particles and a transparent binder, wherein the transparent particles are agglomerated at random and bound with the transparent binder, to provide a surface unevenness exceeding an average particle diameter of the transparent particles and a porosity.

The present invention further provides a display apparatus comprising a display surface for data display, a sheet of protection plate disposed in front of the display surface, and the above-mentioned anti-reflection film formed on the display surface or on the protection plate.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Figure 1:
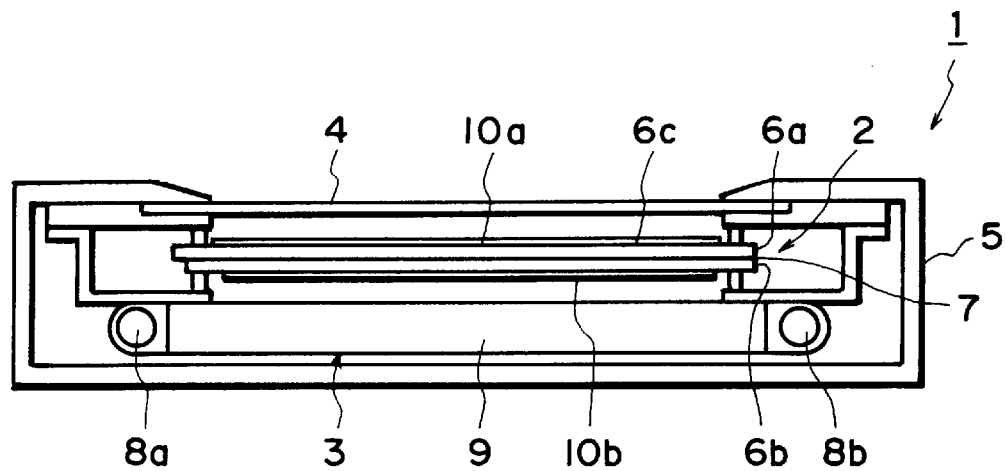
FIG. 1 is a sectional view showing a basic structure of a liquid crystal display apparatus.
Figure 2:
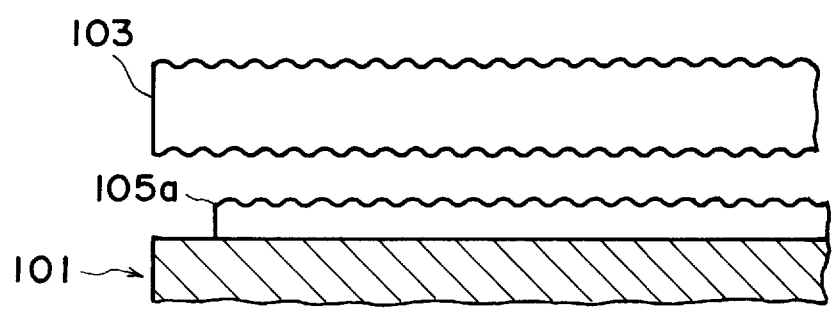
FIG. 2 is an enlarged sectional view of a part in proximity to a protection plate of a liquid crystal display apparatus.

A liquid crystal display apparatus according to an embodiment of the present invention may have an entire structure similar to one described with reference to FIG. 1. Thus, the liquid crystal display apparatus 1 includes a transmission-type liquid crystal panel 2, a backlight device 3 for illuminating the liquid crystal panel 2 from a back side thereof, and a transparent protection plate (face plate) 4 for protecting the liquid crystal panel 2 from an external impact, etc. The liquid crystal panel 2, the backlight device 3 and the protection plate 4 are affixed to a case or housing 5.

The liquid crystal panel 2 comprises a pair of glass substrates 6a and 6b, and a liquid crystal 7, such as a ferroelectric liquid crystal, disposed between the substrates, so that the transmittance through the liquid crystal 7 is controlled based on the electro-optical effect of the liquid crystal to display data on a data display surface 6c.

The backlight device 3 is disposed behind the liquid crystal panel 2 and includes fluorescent lamps 8a and 8b as light sources, a light-guide plate 9 surface-treated for luminance uniformization, a reflection plate (not shown) and a diffusion plate (not shown).

The protection plate 4 is formed of a thin sheet of transparent glass material (e.g., 1.8 mm-thick glass sheet having a refractive index (n) of 1.5), etc., and is disposed to face the data display surface 6c of the liquid crystal panel 2 with a prescribed gap therefrom so as to protect the liquid crystal panel 2 from an external impact, etc.

On both surfaces of the liquid crystal panel 2, a pair of polarizers (polarizing plates) 10a and 10b each allowing selective transmission of light having a plane of polarization in a prescribed direction are applied. The polarizer 10a may preferably be formed to have an uneven surface as an antiglare treatment for causing scattering reflection of light incident from surrounding illumination appliances, etc.

Further, on both surfaces thereof, the protection plate 4 may be provided with an anti-reflection film 11 comprising a single layer of material having a refractive index different from that of the protection plate 4 or a plurality of layers (e.g., three layers 11a–11c as in the embodiment of FIG. 3), having mutually different refractive indices for controlling the brightness of reflected light based on optical interference, which may be formed, e.g., by the sol-gel coating method.

Figure 3:
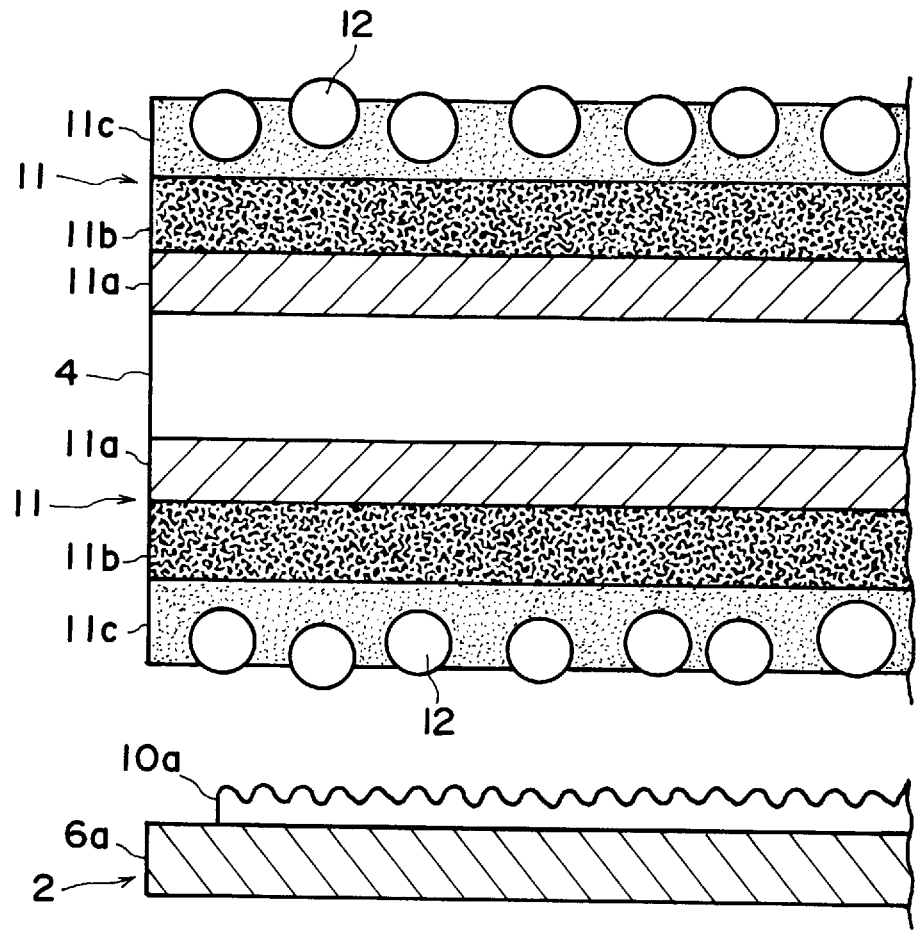
FIG. 3 is an enlarged sectional view of an essential part of an embodiment of the liquid crystal display apparatus according to the present invention.

More specifically, the anti-reflection film 11 in the embodiment of FIG. 3 comprises three layers of an inner layer 11a, an intermediate layer 11b and an outer layer 11c, of which the inner layer 11a may be formed, e.g., as a 80 nm-thick coating layer having a refractive index of 1.7 formed from a mixture of a silicate coating agent (e.g., a 1/1 (wt.) mixture of $Si(OC_2H_5)_4$ and $C_2H_5OH$) and a titanate coating agent (e.g., a 1/4/4 (wt.) mixture of Ti $(O\text{-}isoC_3H_7)_4/C_2H_5OH/C_2H_5OC_2H_4OH$) in a volume ratio of 65:35; the intermediate layer 11a, as an 80 nm-thick coating layer having a refractive index of 2.2 formed from the titanate coating agent; and the titanate coating agent; and the outer layer 11c, as an averagely 90 nm-thick coating layer having a refractive index of 1.4 formed from a 6/4 mixture of the silicate coating agent and silica beads 12 having an average diameter of 85 nm so as to provide an uneven surface.

In the above-described liquid crystal display apparatus, the unevennesses of the polarizer 10a and the anti-glare-treated surface of the protection plate 4 may be adjusted to provide improved display quality and anti-glare effect. More specifically, in the liquid crystal display apparatus having a structure as shown in FIG. 1, a series of experiments performed by us for examining a relationship between the pitch of arrangement of matrix pixels of the liquid crystal panel 2 and the unevenness pitch of antiglare-treated surfaces of the polarizer 10a and the protection plate 4 has revealed that an optical refraction irregularity between the antiglare-treated surface and the pixels is liable to occur in case where the antiglare-treated surface has an unevenness pitch exceeding a half of the pixel pitch. As a result, a luminance irregularity is liable to occur at individual pixels recognized by an observer, and the luminance irregularity at individual pixels can change in response to movement of viewing lines or directions from the observer, so that the display can glare to result in an inferior display quality.

Further, according to our experiments, it has been also found that an average unevenness pitch of the antiglare-treated surface of smaller than 20 $\mu$m can fail to cause sufficient diffusion of reflected light at the antiglare-treated surface. As a result, in the case of an average unevenness pitch smaller than 20 $\mu$m of the antiglare-treated surface, a contour of a surrounding object, such as a surrounding illumination light source, can be recognized as a reflection image, thus resulting in an insufficient antiglare effect.

Taking the above-mentioned experimental results into consideration, in the embodiment of the liquid crystal display apparatus according to the present invention, the average unevenness pitch of the anti-reflection film 11 provided by inclusion of silica beads 12 in the outer layer 11c, and the average unevenness pitch of the antiglare-treated surfaces of the polarizer sheets 10a and 10b, may respectively be set to at most a half of a pixel pitch (e.g., 115 $\mu$m) of the liquid crystal panel 2 and at least 20 $\mu$m, preferably in the range of 20–30 $\mu$m.

Incidentally, an anti-reflection film having an outermost unevenness-imparted surface as described above can also be formed on a front surface of the polarizer 10a facing the protection plate 4. It is further preferred that the remaining surfaces among both surfaces of the protection plate and the front surface of the polarizer other than those provided with the above-mentioned anti-reflection film are antiglare-treated for promoting random reflection.

The function of the above-mentioned embodiment of the liquid crystal display apparatus will now be described.

The fluorescent lamps 8a and 8b of the backlight device 3 are turned on to illuminate the liquid crystal panel 2 from the back side thereof, so that data displayed on the data display surface 6c side of the liquid crystal panel 2 can be viewed through the protection plate 4.

As a structure including the protection plate 4 suppresses an external stress applied to the liquid crystal panel 2, the occurrence of alignment disorder of the liquid crystal 7 may be prevented be ensure a good display quality. Particularly, in the case of a ferroelectric liquid crystal utilizing an alignment state in smectic phase, it is important to suppress an external stress so as to prevent an alignment disorder.

Both surfaces of the protection plate are respectively provided with an anti-reflection film 11 comprising three layers 11a–11c including an outermost layer 11c in which silica beads 12 are dispersed to provide a surface unevenness as an antiglare treatment. Particularly, the average surface unevenness pitch of the outer layer 11c of the anti-reflection film 11, and the average surface unevenness pitch of the antiglare-treated surfaces of the polarizers 10a and 10b, are respectively set to be at most a half of pixel pitch (e.g., 115 $\mu$m) of the liquid crystal panel 2 and at least 20 $\mu$m, preferably in the range of 20–30 $\mu$m, so that reflected light of incident light from illumination appliances, etc., is reduced in its brightness owing to optical interference and diffusion effect, while suppressing whitish appearance of the display surface due to scattered reflection light and reflection of images of surrounding objects such as illumination appliances, thus allowing improved recognition of display on the liquid crystal panel 2.

Particularly, by adjusting the unevenness pitch of the antiglare-treated outermost layer of the anti-reflection film 11 in the above-described manner, the occurrence of optical irregularity in display on the liquid crystal panel 2 and the occurrence of reflection images of surrounding objects are prevented to provide an improved antiglare effect and maintain a good display quality.

Further, as the surface of the polarizer 10 is also antiglare-treated (in case where the anti-reflection film is not provided thereon), the reflection glare on the surface of the polarizer 10a is also suppressed.

Next, a second embodiment will now be described with reference to FIG. 4.

Figure 4:
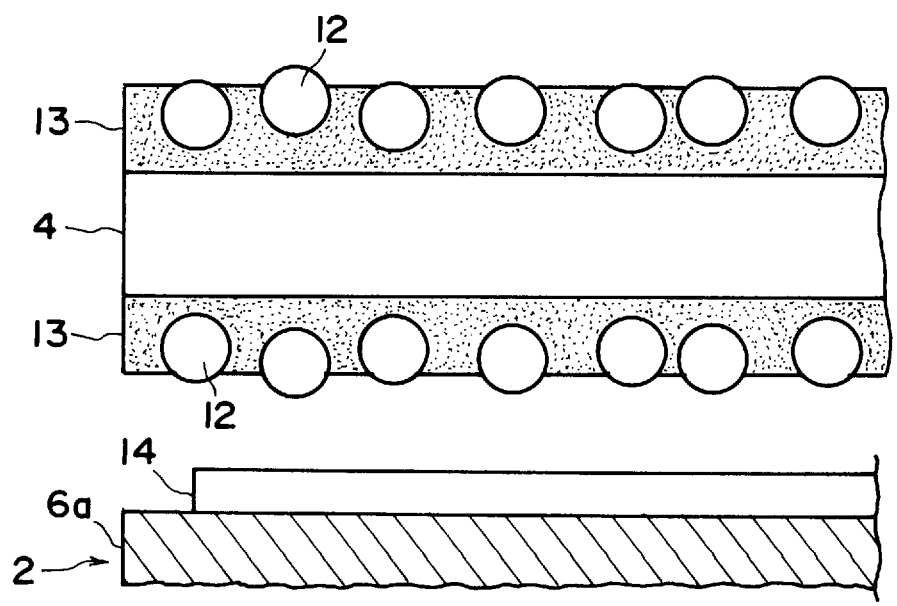
FIG. 4 is an enlarged sectional view of an essential part of another embodiment of the liquid crystal display apparatus according to the present invention.

In this embodiment shown in FIG. 4, the protection plate 4 is provided with a single-layered anti-reflection film 13 each on both surfaces thereof. Each anti-reflection film 13 may be formed, e.g., by the sol-gel coating method.

More specifically, the anti-reflection film 13 may for example be formed in an average thickness of 100 nm to have a refractive index of 1.4 by applying a silicate coating agent together with silica beads having an average diameter of 85 nm mixed therewith so as to provide a surface unevenness to the anti-reflection film 13.

The average unevenness pitch provided by inclusion of the silica beads onto the anti-reflection film 13 may be set to at most a half of the pixel pitch (e.g., 115 $\mu$m) of the liquid crystal panel 2 and at least 20 $\mu$m, preferably 20–30 $\mu$m.

The liquid crystal panel 2 is provided on both surfaces thereof with a pair of polarizers 10a and 10b, respectively, and the polarizer 10a on the front side is coated with an anti-reflection film 14 of, e.g, a metal oxide or fluoride.

The other structures in the second embodiment are similar to those in the first embodiment.

In this embodiment, a single-layered anti-reflection film 13 is formed on both surfaces of the protection plate 4, a surface unevenness is provided by inclusion of the silica beads 12 as an antiglare treatment, and particularly the unevenness pitch provided to the anti-reflection film 13 is set to at most a half of the pixel pitch of the liquid crystal panel 2 and at least 20 $\mu$m, preferably 20–30 $\mu$m, the luminance of reflected light arising from incident light from illumination appliances, etc. is reduced to suppress a whitish appearance of the display surface due to scattered reflection light, and the occurrence of reflection images of surrounding objects, such as illumination appliances, is remarkably prevented to allow an easy recognition of display on the liquid crystal panel 2.

Particularly, by adjusting the unevenness pitch of the antiglare-treated anti-reflection film 13 in the above-described manner, the occurrence of optical irregularity in display on the liquid crystal panel 2 and the occurrence of reflection images of surrounding objects are prevented to provide an improved antiglare effect and maintain a good display quality.

Further, as the front surface of the polarizer 10a is coated with an anti-reflection film 14, the reflection of incident light from surrounding illumination appliances, etc., at the surface of the polarizer 10a is suppressed.

In the above embodiment, both surfaces of the protection plate 4 are provided with an anti-reflection film 13 having three layers or an anti-reflection film 11 of a single layer so as to have an uneven surface by inclusion of silica beads 12. However, it is also possible to use, in place of the silica beads 12, other transparent particles having a refractive index similar to that of the outermost layer 11c of the anti-reflection film 11 or that of the anti-reflection film 13 and a diameter smaller than the thickness of the layer 11c or the film 13 or non-spherical (e.g., acircular or bar-shaped) paraticles for providing a surface unevenness to the outer layer 11c or the anti-reflection film 13.

Alternatively, it is also possible to form the three layers of anti-reflection film 11 or the outer layer 11c thereof together with a surface unevenness, or the single-layered anti-reflection film 13 or a surface unevenness thereof by printing.

Figure 5:
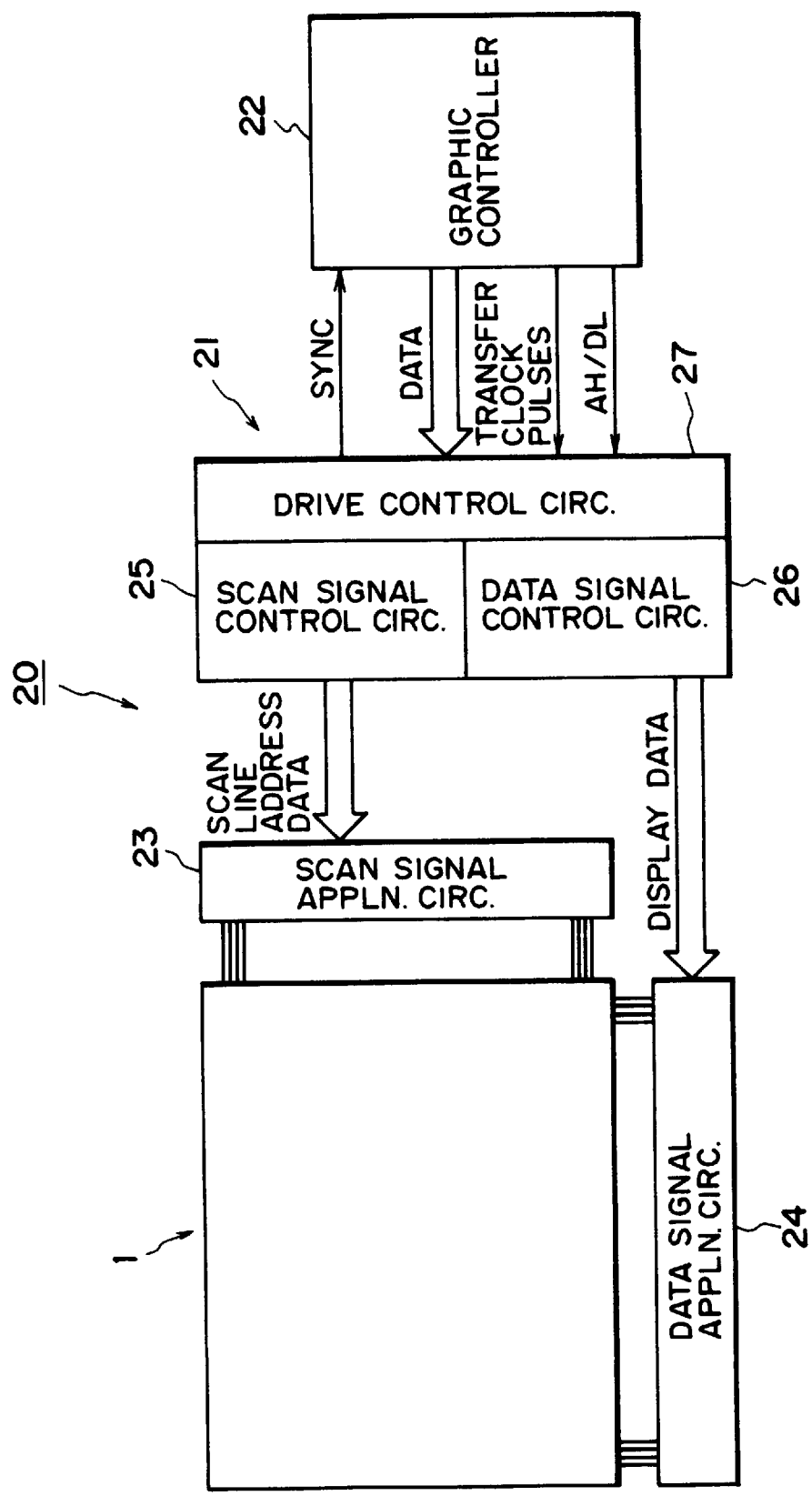
FIG. 5 is a block diagram of a liquid crystal display apparatus according to the present invention.

FIG. 5 is a block diagram of a data transmission apparatus 20 including a liquid crystal display apparatus 1 as described above. The data transmission apparatus 20 includes the above-mentioned liquid crystal display apparatus 1, a drive controller unit 21 and a graphic controller 22.

The liquid crystal panel 2 of the liquid crystal display apparatus 1 has, e.g., 1280×1024 pixels and is connected with a scanning signal application circuit 23 and a data signal application circuit 24.

The drive controller unit 21 includes a scanning signal control circuit 25, a data signal control circuit 26 and a drive control circuit 27. The scanning signal control circuit 25 supplies scanning line address data to the scanning signal application circuit 23, and the data signal control circuit 26 supplies display data to the data signal application circuit 24. Further, the graphic controller 22 supplies data and a scanning scheme signal to the scanning signal control circuit 25 and the data signal control circuit 26 via the drive control circuit 27.

The data supplied from the scanning signal control circuit 25 and the data signal control circuit 26 is converted into address data and display data, and the scanning scheme signal is supplied as it is to the scanning signal application circuit 23 and the data signal application circuit 24.

The scanning signal application circuit 23 supplies a scanning signal having a waveform determined based on the scanning scheme signal to the scanning electrodes sequentially selected based on the address data, and the data signal application circuit 24 supplies data signals having waveforms determined based on the display data corresponding to the white or black display state and the scanning scheme signal.

Next, a preferred embodiment of the antiglare-type anti-reflection film which may be suitably used in display apparatus in general will now be described.

Figure 6:
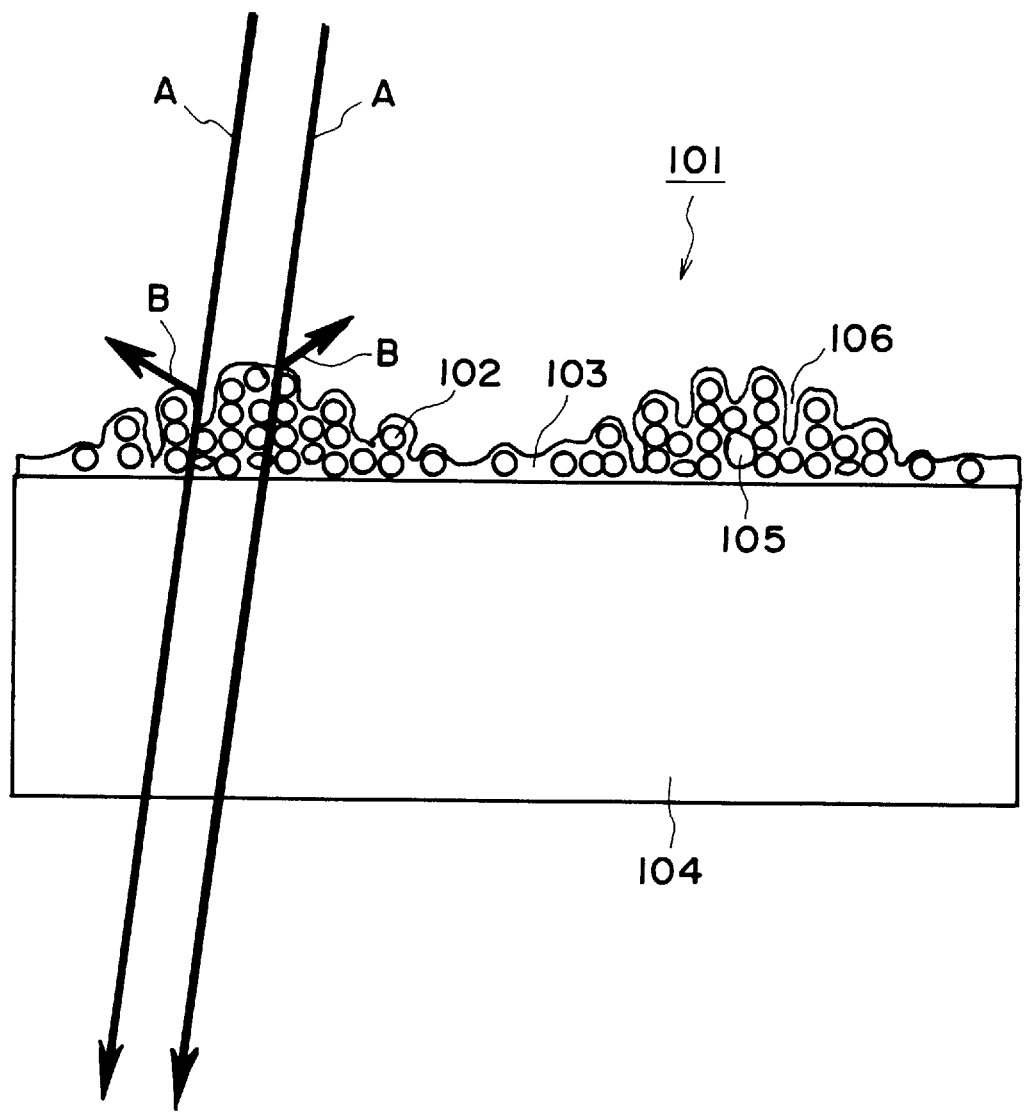
FIG. 6 is an enlarged sectional view of an anti-reflection film according to an embodiment of the present invention.

FIG. 6 is an enlarged sectional view of an anti-reflection film according to an embodiment of the present invention. Referring to FIG. 6, the anti-reflection film 101 comprises a multitude of silica particles 102 and a binder glass 103 binding the silica particles, and is formed on a transparent glass substrate 104.

The multitude of silica particles 102 are agglomerated at random so that each agglomerate includes, e.g., ca. 150–300 particles and the silica particles 102 are bound by the binder glass 103 to be attached so as to form an irregular unevennesses at irregular pitch on the order of at least 10 times, preferably at least 100 times, the average particle diameter and a difference in height (roughness) of, e.g., at least ca. 1 times, preferably at least ca. 2 times the average particle diameter. Further, the degree of random agglomeration may be represented by a σ-value of agglomerate size distribution of at least 30% of the average.

The individual silica particles 102 are bound by the binder 103 and connected to each other in an irregular and three-dimensional matrix to provide a porous film 101 by minute bubbles 105 and pores in the binder glass 103. A preferred degree of porosity may be a volume percentage of 20–80% of voids (bubbles and pores) in the film.

The anti-reflection film 101 may be basically formed by a sol-gel process wherein a sol after some degree of gelling for providing an appropriate size of agglomerate is blended with silica particles 102, applied on the glass substrate 104 and baked thereon.

As an example of preferred sizes, the silica particles may have a particle diameter of 50–100 nm, and the anti-reflection film may have a thickness of 100–200 nm, a silica particle mixing ratio of ⅓–⅔, an average unevenness pitch of 5–15 μm, an average roughness pitch of 0.1–0.3 μm, a void (pore or bubble) size of 0.1–1 μm, and a refractive index of 1.2–1.4.

The preparation of such an anti-reflection film 101 is described with reference to a specific example.

First, 30 g of tetraethylorthosilicate (Si(OC$_2$H$_5$)$_4$), 15 g of ethanol (C$_2$H$_5$CH), 0.72 ml of hydrochloric acid (HCl, 30 mol. % aqueous solution) and 4.66 ml of pure water (H$_2$O) were blended with each other and, after aeration with nitrogen (N$_2$), reacted for 24 hours.

Then, ethanol (C$_2$H$_5$OH) was added to the reaction liquid to supplement the amount of ethanol lost by evaporation due to the N$_2$ aeration, and an appropriate amount of ethylcellosolve (C$_2$H$_5$OC$_2$H$_4$OH) was added so that the resultant liquid contained 4 wt. % of silica (calculated as SiO$_2$). The reaction liquid was filter under pressure through membrane filters of 3 μm and 0.25 μm in superposition to prepare a sol.

Separately, a silica liquid ("Organo Silica Sol EG-ST-ZL" (trade name) available from Nissan Kagaku Kogyo K.K., dispersed in ethylene glycol, particle diameter=70–100 nm) was subjected to stirring and dispersion for 5 min. by a homogenizer at 15000 rpm to prepare a silica dispersion.

Then, the above-prepared sol and silica dispersion were blended in a ratio of 2:1 to obtain a mixture liquid, which was then subjected to spin coating on a glass substrate for 5 sec at 300 rpm and 30 sec at 2000 rpm, followed by baking for 15 min at 180° C. and 60 min at 340° C., to form an anti-reflection film.

The thus-formed anti-reflection film 101 was found to have a sectional structure as shown in FIG. 6. It had been found possible to control the macroscopic surface unevenness size due to agglomeration of silica particles 102 by changing the standing time between the spin coating for 5 sec at 200 rpm and the spin coating for 30 sec at 2000 rpm (allowing change with time under standing of the sol and the silica dispersion) to some extent such that a longer standing time provided a larger unevenness.

For example, in the case where the standing time was within 1 min. on a soda line glass substrate 104, the resultant anti-reflection film 101 provided a surface unevenness having an average pitch smaller than 15 pm and an average roughness smaller than 0.3 μm.

As shown in FIG. 6, the anti-reflection film 101 exhibited a microscopic structure include many minute bubbles 105 and pores 106 mostly having a size of at most 1 μm (on or smaller than the order of visible wavelengths), thus forming a very fine porous structure.

When light (denoted by A in FIG. 6) from interior illumination source (fluorescent lamps etc.) was incident to the anti-reflection film 101, the light was scattered at the surface unevenness to provide reflected light (B in FIG. 6), whereby a sufficient scattering effect (antiglare effect) was attained.

The anti-reflection film 101 was formed in a fine porous structure and therefore exhibited a refractive index of at most 1.3 smaller than that (1.5 or smaller) of the silica particles and the binder glass 103.

Accordingly, the anti-reflection film 101 exhibited a smaller refractive index difference with air and a smaller Fresnel reflection coefficient, thus providing a sufficient anti-reflection effect.

Thus, the anti-reflection film according to this embodiment, regardless of a single layer structure thereof, can exhibit sufficient scattering effect (antiglare effect) and anti-reflection effect, thus providing an improved antiglare performance.

Figure 7:
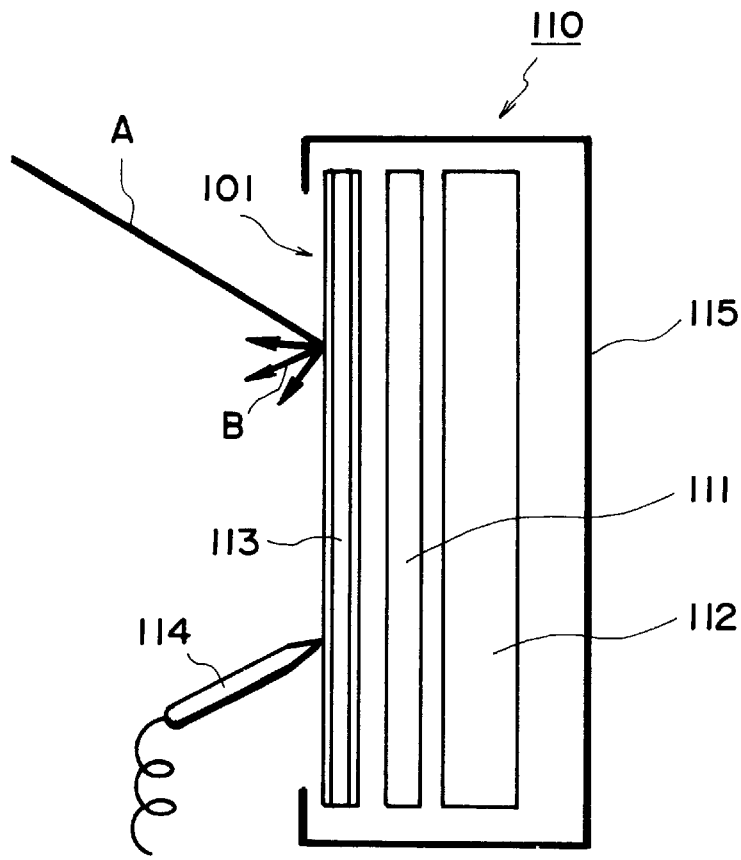
FIGS. 7 and 8 are respectively a schematic sectional view of a display apparatus provided with an anti-reflection film according to the present invention.

FIG. 7 is a schematic sectional view of an example of display apparatus including an anti-reflection film 101 as described above.

The display apparatus 110 is a liquid crystal display apparatus equipped with a tablet for pen inscription (input) and includes a liquid crystal display panel 111, a backlight 112, and a glass-made tablet sheet 113, which are incorporated within and attached to a housing 115, and may be used together with an ultrasonic wave-generating pen 114.

Both surfaces of the tablet sheet 113 are provided with an anti-reflection film 101 described above.

As the tablet sheet 113 for pen-input with the ultrasonic generating pan 114 of the display apparatus 110 is provided with the anti-reflection film 101, even if light A from the room illumination is incident to the surface of the tablet sheet 113, a sufficient scattering effect and an anti-reflection effect can be attained as described above, so that the deterioration of display quality due to the reflection light B can be remarkably reduced.

As a result, it becomes possible to provide improved antiglare effect and recognizability of display data on the liquid crystal display panel illuminated by the backlight 112.

Figure 8:
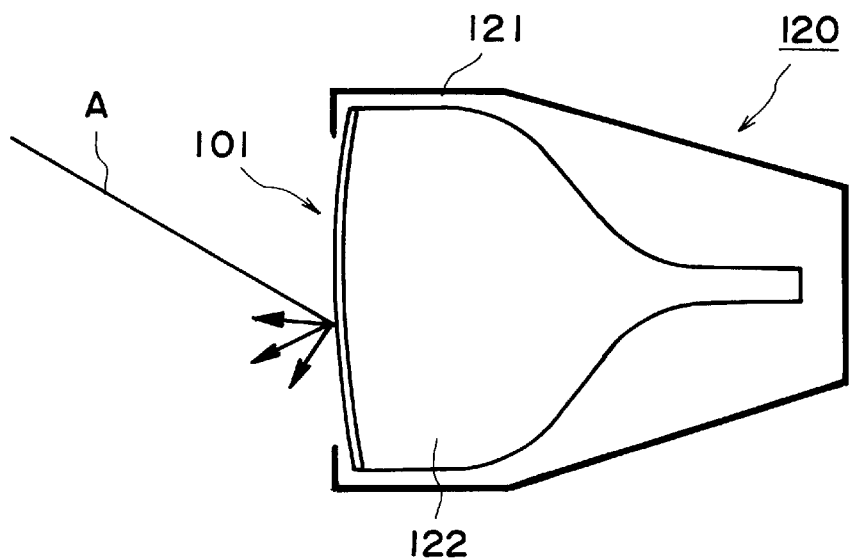

FIG. 8 is a schematic sectional view of a display apparatus including a CRT and provided with an anti-reflection film 101 as described above.

The display apparatus 120 includes a CRT 122 for data display disposed within a housing 121, and the display surface of the CRT 121 is coated with an anti-reflection film 101 as described above.

As the display surface of the CRT 122 of the display apparatus is coated with the anti-reflection film 101, even if light A from the room illumination (fluorescent lamp, etc.) is incident to the display surface of the CRT 122, a sufficient scattering effect and an anti-reflection effect can be attained as described above, so that the deterioration of display quality due to the reflection light B can be remarkably reduced.

As a result, it becomes possible to provide improved antiglare effect and recognizability of display data on the CRT 122.

In the display apparatus 110 shown in FIG. 7, the anti-reflection films 101 are formed on a tablet sheet 113. In an ordinary liquid crystal display apparatus as shown in FIG. 1 having no tablet sheet, the anti-reflection film may be provided on one or both surfaces of a protection plate 4 disposed in front of a liquid crystal panel so as to provide improved antiglare effect and recognizability.

In the display apparatus 120 shown in FIG. 8, the anti-reflection film 101 is formed on the CRT surface. However, it is also possible to coat both surfaces of a transparent sheet member with an anti-reflection film 101 as described above, and dispose the coated transparent sheet member in front of a display apparatus as a separate antiglare filter.

The anti-reflection film described with reference to FIG. 6 may also be applied to any type of display apparatus, including plasma display apparatus in addition to the CRT display apparatus shown in FIG. 8 and the liquid crystal display apparatus shown in FIG. 7.

As described above, the present invention provides a display apparatus including an anti-reflection film disposed on at least a front surface on an opposite side with respect to the liquid crystal panel of the protection plate among two surfaces of the protection plate and a surface of the polarizer sheet, such that the anti-reflection film has a layer structure including at least one layer for promoting optical interference to decrease reflected light brightness and provided with surface unevenness at a prescribed pitch, whereby the luminance of reflected light of incident light from illumination appliances, etc., is reduced to suppress a whitish appearance due to scattering of reflected light, and the occurrence of reflection images of such illumination appliances, etc., is prevented, thus allowing an easy and better recognition of display on the liquid crystal panel.

Further, by setting the surface unevenness pitch of the anti-reflection film to at least 20 μm and at most a half of the pixel arrangement pitch of the liquid crystal panel, it becomes possible to prevent the occurrence of optical irregularity in display and provide an improved antiglare effect, thus maintaining a good display quality.

The present invention further provides a porous anti-reflection film comprising transparent particles agglomerated at random and a transparent binder binding the transparent particles and provided with a surface unevenness exceeding the average particle size (diameter) of the transparent particles. The anti-reflection film shows a sufficient scattering effect (antiglare effect) and anti-reflection effect. By applying the anti-reflection effect onto display apparatus, such as a liquid crystal display apparatus and a CRT display apparatus, it is possible to provide improved antiglare effect and observability of such display apparatus.

What is claimed is:

1. An anti-reflection film, comprising transparent particles and a transparent binder, wherein the transparent particles are agglomerated at random as to provide a standard deviation σ of agglomerate size distribution of at least 30% of average agglomerate size and bound with the transparent binder, to provide a surface unevenness exceeding an average particle diameter of the transparent particles and a porosity.

2. An anti-reflection film according to claim 1, wherein said transparent particles comprise silica particles.

3. An anti-reflection film according to claim 1, wherein said transparent particles comprise an inorganic glass.

4. An anti-reflection film according to claim 1, wherein said transparent binder comprises a glass material principally comprising silica.

5. An anti-reflection film according to claim 1, which has been formed by blending silica particles as the transparent particles with a silica sol after a controlled degree of gelling, applying a resultant mixture liquid onto a substrate to form a coating layer, and calcining the coating layer.

6. A display apparatus comprising a display unit having a display surface for data display, and an anti-reflection film according to any of claims 1–5 disposed on the display surface or on at least one surface of a transparent sheet member disposed in front of the display surface.

7. A display apparatus according to claim 6, wherein the display unit comprises a cathode ray tube.

8. A display apparatus according to claim 6, wherein the display unit comprises a liquid crystal display apparatus.

* * * * *